April 21, 1953  T. F. GERDINE  2,635,659
METHOD OF HANDLING TIMBERS
Filed Dec. 16, 1947  2 SHEETS—SHEET 1

Inventor
THOMAS F. GERDINE

April 21, 1953
T. F. GERDINE
2,635,659
METHOD OF HANDLING TIMBERS
Filed Dec. 16, 1947
2 SHEETS—SHEET 2
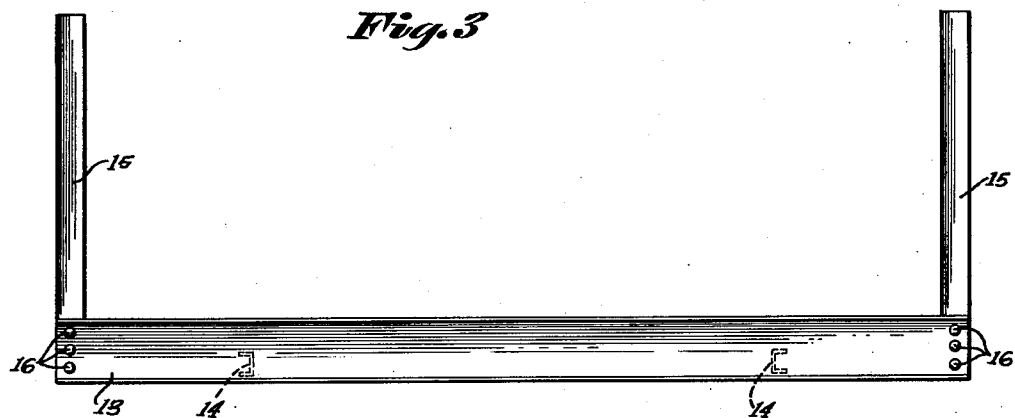
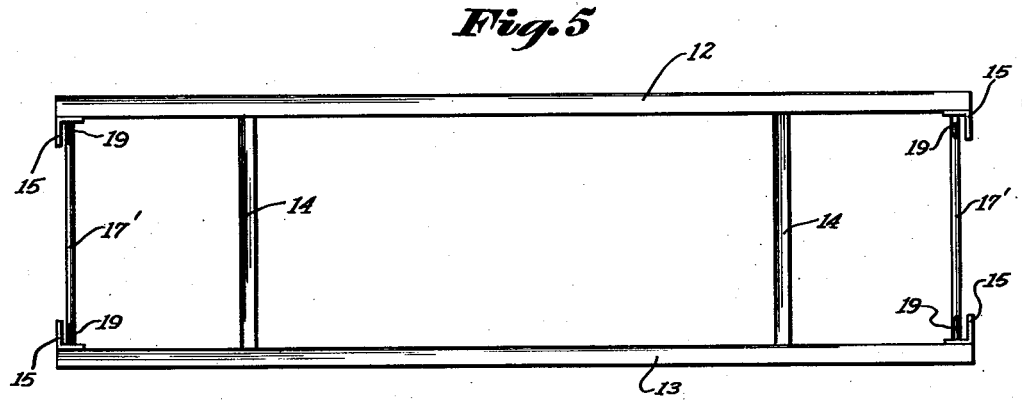
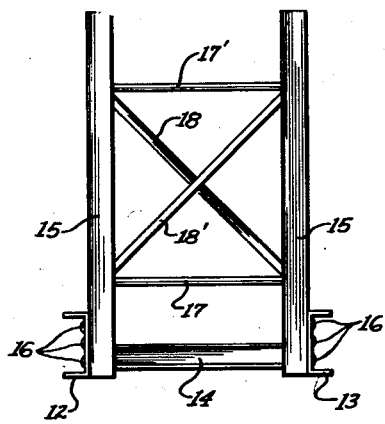
Inventor
THOMAS F. GERDINE Patented Apr. 21, 1953

2,635,659

UNITED STATES PATENT OFFICE 2,635,659

METHOD OF HANDLING TIMBERS

Thomas F. Gerdine, Athens, Ga.

Application December 16, 1947, Serial No. 792,001

6 Claims. (Cl. 144—309)

The present invention relates in general to method and apparatus for processing tree trunks or timbers and more particularly to a method for expeditiously handling and transporting the tree trunks from the felling site to the site where the tree trunks or timbers are to be further processed as in making ties, mine props, pulp wood and the like.

Heretofore it has been common practice in preparing tree trunks or timbers for the making of pulp wood or the like, to top and trim tree trunks at the site of felling and then to individually cut up the trunks into shorter lengths at the felling site to facilitate handling and the transportation of the timbers to fixed plants where the timbers are to be further processed. As an alternate to this, another common practice is to top and trim the tree at the felling site and haul the individual timbers to a central location where they are individually handled while being cut into shorter lengths to facilitate further handling and transportation. In the latter event, each length of the timbers must be handled individually or in small groups when power apparatus such as cranes are used during the loading and handling operations. In view of the fact that an individual operation is performed to cut each timber into separate lengths or sections and thereafter individual loading operations must be performed on each length or section, it will be readily apparent that the number of specific operations are greatly multiplied. With these prior methods much time and labor, and consequently large costs are involved in converting a standing tree into separate lengths or sections and transporting them by different types of vehicles or conveyors which are usually required between the felling site and the processing site. In some instances where the standing trees are located in remote or rather inaccessible places, the individual operations may become greatly multiplied because the individual lengths or sections of timbers must be transferred between vehicles or conveyors of progressively increasing capacity, such as from an individual tractor which may drag a single tree trunk or timber to a point where the timber may be transferred in one piece or several pieces to a sled or a narrow gauge railway or a truck to a standard gauge railway or a barge for water transportation.

Accordingly, an object of the present invention is the provision of a novel method for processing and transporting felled trees whereby a large quantity of such trees may be felled, processed and transported from the felling site to a remote processing site with a high degree of efficiency and economy.

Another object of the present invention is the provision of a novel method for grouping the timbers from a large number of felled trees into cargo units of convenient size and character for transporting and handling of the trees.

Another object of the present invention is the provision of a novel method for conditioning a large group of felled trees for convenient transfer between carrying devices and delivery of the trees from the site of felling to a processing site.

Another object of the present invention is the provision of a novel device for collecting and retaining raw logs for convenient and economical handling of the logs during transport to their destination.

Other objects, advantages and capabilities of the present invention will become apparent from the following detail description, taken in conjunction with the accompanying drawings, in which:

Figure 3 is a side view of a cradle for use in forming bundles of logs adapted for transfer by crane;

Figure 4 is an end view of the cradle employed in the present invention; and

Figure 5 is a top view of the cradle structure employed in the present invention.

Figure 1:
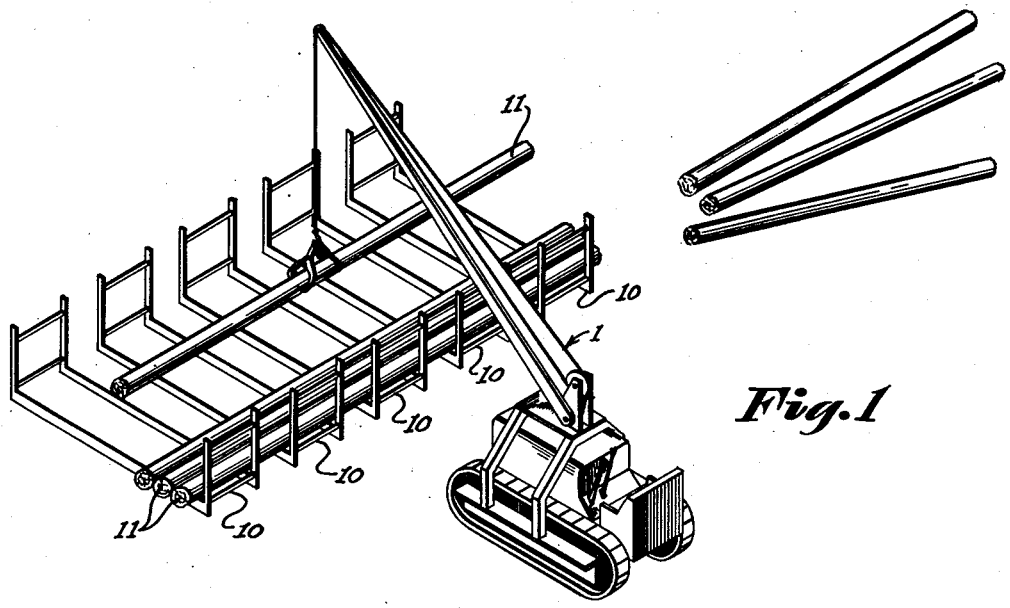
Figure 1 is a perspective view showing a diagrammatic illustration of the manner of arranging and loading cradles in handling and transporting tree trunks or timbers processed therefrom in accordance with the present invention.

The present invention provides a novel method of collecting felled trees in groups in retaining frames or cradle structures adapted to receive and retain tree trunks or timbers processed therefrom in bundle form convenient for transferring the bundles from one vehicle or conveying device to another to effect transportation of the trees from the felling site to the site of a processing plant, such as a saw mill or plant for making pulp wood and the like and particularly to reduce the expense and time involved in connection therewith.

The selected trees to be used in the manufacture of pulp wood, in accordance with the present method, are to be felled by conventional means, such as a portable, circular or chain power saw. The felled trees are then limbed and topped by means of the circular power saw or other convenient tools adapted for high speed cutting through large cross-sections, at the site where they are felled, reducing them to bare trunks or timbers. The felled and trimmed tree trunks are then moved such as by dragging with a small tractor from the point of felling to a central location at a suitable road or draglane for loading on a plurality of spaced retaining frames or cradle structures. The tree trunks may be hoisted on to the cradle structures by suitable portable crane hoists, such as a crane tractor of any of the type commercially available. The cradles shown in detail in the accompanying drawing and indicated generally at 10, are disposed in transverse alignment with their open sides adjacent each other but spaced from the adjacent cradles 10 by some two feet, to receive the felled trees for collecting them into groups of convenient number for transfer and for reducing them to appropriate size for transportation in bundles.

The cradles 10 are constructed to form upwardly opening, U-shaped carriers for receiving the tree trunks or timbers processed therefrom, which are generally indicated at 11. The cradles or carriers 10 are, in effect, slings on to which the tree trunks may be laid in a stack so that when the trunks are severed, as will be described later, each cradle and the severed portions of the stacked trunks and the respective cradle in which they are retained immediately become an individual cargo unit as a result of a minimum number of processing steps.

The cradles 10 comprise a pair of laterally spaced I-beams 12 and 13 extending longitudinally thereof intercoupled and braced by crossbeams 14 which may be secured to the longitudinal beams as by brazing or welding. The two I-beams 12 and 13 constitute the bottom of the cradle for receiving the tree trunks and sections thereof. These longitudinal beams may also serve as the runners if it is desired to drag the cradles along the ground.

Extending upward on parallel vertical axes at each corner of the base of the cradle 10 are corner posts 15, formed of angle iron members and secured at the lower ends thereof to the ends of the I-beams 12 and 13 by rivets 16 or other convenient securing means to maintain the ends formed by the corner posts 15 extending perpendicularly from the beams 12 and 13 when logs are loaded on the cradle. Transverse braces 17, 17' formed of iron rods of cylindrical cross section are disposed horizontally between the pairs of corner posts 15 at each end of the base of the cradle 10, and secured to a face of each of the corner posts 15 as by welding or brazing. Likewise, crossed iron U-shaped beams 18, 18' are disposed between the pairs of corner posts 15 extending diagonally between the transverse braces 17, 17', to further strengthen the ends of the cradle 10. The corner posts 15 and the diagonal braces 18, 18' constitute end walls against which the tree trunks or sections thereof are stacked. At the upper end of each of the corner posts 15, a metal ring 19 is welded, positioned to extend outwardly from the outer face of each corner post 15, the rings 19 to receive suitable crane hooks or the like implements for convenience in lifting the cradles. The cradles 10, in practice, are constructed to be approximately 9 feet in length, 3 feet in width, and 5 feet in height.

Figure 2:
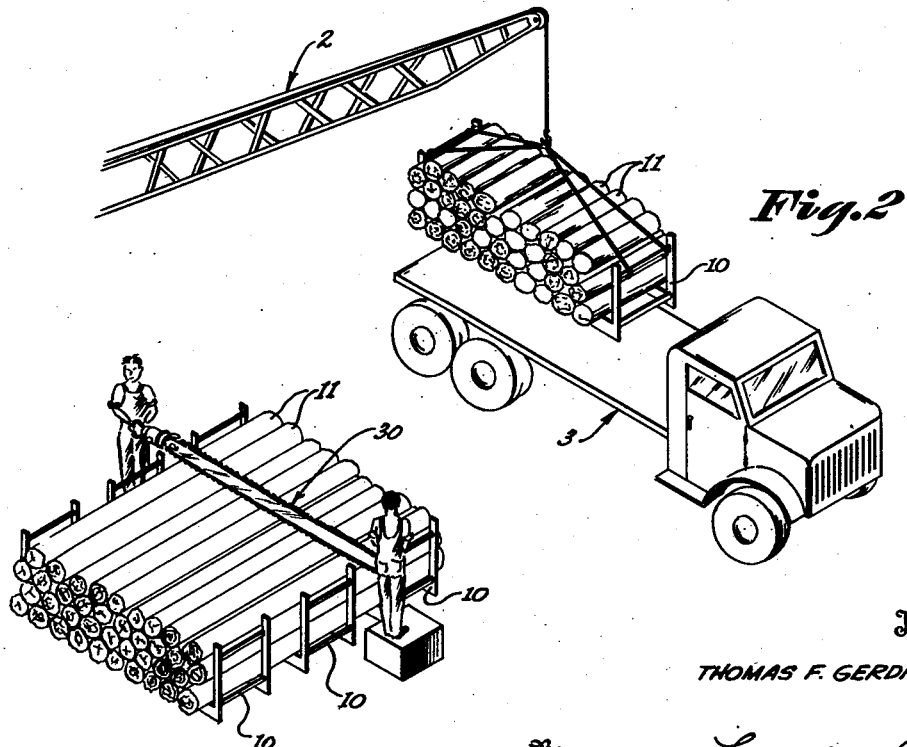
Figure 2 is a perspective view illustrating diagrammatically the manner in which the trunks or timbers are severed and the sections thereof are retained in the spaced cradles, thereafter to be handled as separate cargo units.

In practicing the method in accordance with the present invention, two or more of the cradles 10 are arranged adjacent to each other side by side with the longitudinal axes of the cradles in parallel relation with an intervening space between the sides of adjacent cradles of approximately two feet. The cradles are so disposed that the end walls thereof are in colinear relation as shown in Figures 1 and 2. Usually a sufficient number of cradles are so arranged to accommodate tree trunks 30 or 40 feet in length. After the tree trunks 11 are placed in the aligned cradles 10, the trunks 11 are cut into approximately 5 foot lengths in cradle loads. Preferably a power driven chain saw 30 of well known construction is used but any suitable type of saw can be used so long as it is capable of making a cut the full length of the cradles across all of the trunks stacked thereon and in one single continuous operation by cutting downwardly through the pile of trunks in a vertical plane. Since the adjacent cradles 10 are spaced approximately 2 feet apart in the illustrated embodiment, a chain saw can be operated easily in the space between the cradles, leaving a bundle of logs of approximately 5 foot lengths on each cradle 10 after the cutting operation. The bundles of the severed sections of the tree trunks or timbers and the respective cradles immediately become individual cargo units which may be thereafter handled as such.

The bundles of logs formed by the cradles 10 are then loaded as individual units on to a truck or trailer in any suitable manner as by means of a crane, block and tackle, or skidded on to the truck or trailer by means of a winch or tractor for conveyance of the cradles of logs to a barge landing or railroad siding, the I-beams 12, 13 forming the base of the cradle 10 serving as runners in the latter method of loading. For convenience in handling the cradles of logs for loading them on to trucks or trailers by means of a crane hoist, an apron or I-beam frame indicated at 20 in Figure 1, of substantially the same size as the base of the cradles 10 can be lowered from a crane hoist 21; the apron or frame having four chains 22 depending downwardly from the four corners of the apron or frame with hooks on the ends of the chains to be coupled with the corner post rings 19 on the cradles, to effect balanced hoisting of the cradles.

The cradles 10 are of convenient size and character to permit stacking of a group of such cradles of logs, disposed transversely of the platform of a truck or trailer, by which the logs may be conveyed directly, without further handling, to the mill or to a barge landing or railroad siding for further transfer of the cradles of logs to barges or freight cars to effect large scale transportation to the final processing location.

The basic steps of the present invention are depicted in Figures 1 and 2 where cradles 10 are shown in aligned relation with the ends thereof arranged in colinear relation. As will be noted, there is a spacing between the adjacent cradles to permit the use of a saw, such as a power-driven chain saw or the conventional cross-cut saw, for severing all of the tree trunks stacked between the ends of the cradles in one single continuous operation, as distinguished from the individual operations where each trunk or timber is handled individually and several cuts are made thereon to cut it into several sections, each of which has to thereafter be handled individually. As is also shown in Figure 1, the cradles are so arranged that there is sufficient number to accommodate logs of a pre-selected average length. In carrying out the present invention trees of a general average length would be felled and trimmed at the felling site and then would be dragged to a central assembly point where a number of cradles sufficient to accommodate trunks or timbers of that general length had been assembled in accordance with the manner illustrated in Figures 1 and 2. The trunks or timbers could be dragged to the central point through suitable draglanes selected by means of tractors or any other suitable means. It is not necessary that the trunks or timbers be stacked at a central point. They can merely be pulled to a more or less point of concentration where a portable crane 1 may be used in the usual manner to lift the timbers singularly, or in any desired group, into the previously arranged cradles, as previously described.

Referring to Figure 2, the next operation is to make single, continuous cuts entirely across the stack of trunks or timbers in the crane by means of a suitable saw such as a power chain saw indicated at 30. This step immediately converts the severed sections of the trunks or timbers in the individual cradles into individual cargo units which may be handled as such thereafter without the necessity of handling each trunk or timber thereafter as an individual unit. A suitable portable crane 2 having the apron previously described may be attached to the four upright posts of the individual cradles for the purpose of lifting the individual cradles onto any suitable means of transportation such as a truck indicated at 3 by means of which the cargo units may be transported to a processing plant. It will be readily apparent that it is not intended to limit the present invention to the means of transportation mentioned herein since these specific means are used merely for illustrative purposes. For instance, if desired, the individual cradles may be dragged to another central point where the cradles and their cargo could be lifted directly on to barges or on to railway cars.

By means of the above cradle structures, a convenient method of effecting transfer of the felled trees to the processing location is made possible, by providing bundle defining means adaptable to be arranged side by side for stacking the trimmed and felled tree trunks in a plurality of such cradles, rendering the step of cutting the trees in already formed groups of bundles into uniform lengths forming individual bundles of a size for convenient handling by crane hoists or like transferring devices for stacking the bundles on carriage means for delivery of the logs to their destination, and thus effecting a radical reduction in the time and labor absorbed in handling a large number of felled trees, in the processing of the trees for transfer to conveying vehicles by the now commercially available transfer devices adapted for handling large quantities of such articles in one operation, in arranging and maintaining the logs on the conveying vehicles, and in transferring the logs from one type of conveying vehicle to another, as frequently required in movement of the trees over considerable distances, the present method obviating any necessity of re-assembling the logs, cut to size for transportation into bundles or groups, each time transfer of the logs from one conveying device to another is required.

It will be readily apparent that the present invention provides a novel method for handling and transporting tree trunks or timbers from the side at which the tree is felled to a plant where the trunks or timbers are to be further processed, particularly in the making of pulp wood. It will be readily apparent, of course, that the invention would be applicable to the handling and transporting of trunks or timbers from which lumber, railroad ties or mine props might be made so long as the final processed product need not be longer than the individual sections into which the trunks or timbers are cut for the purpose of facilitating handling and transportation. The present invention represents a progressive step in the elimination of the large number of handling operations necessary when the individual trunks or timbers are individually cut into the various lengths of sections, each of which must thereafter be handled individually. It will be readily apparent also that there can be minor departures from the specific order of steps described herein for purposes of illustration without departing from the basic steps of the method of the present invention. The invention resides primarily in the basic steps and not particularly in the order of the steps.

Although in the foregoing description reference is made to preselected logs of average length, it is to be understood that no special effort is made to select trees of any given average height. It will be readily understood that all trees that are marked by the owner of the timber tract must be cut. As a general rule trees in a given area will usually be of nearly the same length and the ones which are longer than the general average can be easily cut off and be thrown on the loaded cradles. Also it will be readily apparent to one skilled in the art that the specific type of machinery used for loading the cranes constitutes no part of the present invention. For example, it usually would require an excessively large crane, such as that illustrated at 2, to lift the loaded cradles onto the truck. A possible more practical method of placing these cradles on the truck would be to use a winch on the truck to pull the cradles up a skid onto the truck bed.

Although I have particularly shown and described a specific example of my invention as applied to the transfer of felled trees from the felling site to trucks or trailers, and from the trucks or trailers to a barge or railroad freight car, it is distinctly understood that transfers through any number of successive carriers of any known types may be made with corresponding results in saving of time and labor of handling the articles, and it is desired, therefore, that only such limitations shall be placed thereon as are imposed by the prior art and are set forth in the appended claims.

What is claimed is:

1. A method of handling and transporting felled tree trunks from the felling site comprising the steps of, arranging a plurality of retaining frames for the trunks in laterally aligned relation spaced from each other and extending over a distance substantially equal to the average length of said trunks, stacking the trunks in the plurality of aligned retaining frames, severing the stacked groups of trunks into sections in a continuous operation on substantially vertical planes between adjacent pairs of retaining frames, and transporting the sections of stacked trunks by movement of the retaining frames.

2. A method for handling logs and partially processing them for use in manufacturing wood pulp comprising the steps of, arranging a plurality of rigid retaining frames for the logs in laterally aligned relation spaced from each other and extending over a distance substantially equal to the average length of said logs, stacking the logs in the plurality of aligned retaining frames, severing the stacked group of logs into sections in single cutting operations on substantially vertical planes between adjacent pairs of retaining frames, and transporting the sections of stacked logs by handling said retaining frames.

3. A method of transporting felled tree trunks comprising the steps of, arranging a plurality of upwardly open cradles for the trunks in laterally aligned spaced relation extending over a distance substantially equal to the average length of said trunks, stacking the trunks in the plurality of aligned cradles transversely of the cradles, forming the stacked trunks into a plurality of bundles of a size convenient for handling by standard transporting apparatus by severing the stacked group of trunks into sections in a continuous cutting operation in a substantially vertical plane between adjacent cradles and transporting the bundles of trunks by movement of the cradles and bundles as individual cargo units.

4. A method for transporting felled tree trunks comprising the steps of arranging a plurality of rigid bundle-defining frames for the trunks in laterally aligned spaced relation extending over a distance substantially equal to the average length of said trunks and opening upwardly, hoisting the trunks into the upwardly opening bundle-defining frames and stacking the trunks transversely of the plurality of frames, forming the stacked trunks into a plurality of bundles of a size convenient for handling by severing the group of trunks into sections at spaced intervals axially of the trunks in continuous cutting operations on substantially vertical planes between adjacent frames, and thereafter moving said bundles and their respective cradles as individual units.

5. A method of conditioning felled tree trunks for transportation comprising the steps of, arranging a plurality of upwardly open rigid cradles for the trunks in laterally aligned spaced relation extending over a distance substantially equal to the average length of said trunks, hoisting the trunks of lengths exceeding that usable in standard transporting apparatus into the cradles and stacking the trunks transversely of the plurality of cradles, and forming the stacked trunks into a plurality of bundles of a size convenient for handling by severing the stacked group of trunks into sections at spaced intervals axially of the trunks in single cutting operations on substantially vertical planes between adjacent cradles whereby the trunks can be transported in stacked sections by movement of the cradles.

6. A method of handling tree trunks or timbers from the felling site comprising the steps of, arranging a plurality of upwardly open rigid retaining frames or conveyors in a side-by-side adjacent relation, placing tree trunks of a length extending over the width of said frames and the intermediate spacing, severing all of the tree trunks placed in said frames at a point between said frames, in one operation, and thereafter handling said retaining frames or holders with the severed sections of trunks or timbers as an individual cargo unit.

THOMAS F. GERDINE.

References Cited in the file of this patent
UNITED STATES PATENTS

| Number | Name | Date |
| --- | --- | --- |
| 375,909 | Wilson | Jan. 3, 1888 |
| 1,730,509 | Janin | Oct. 8, 1929 |
| 2,103,317 | Cavagnaro | Dec. 28, 1937 |
| 2,247,695 | Papendick | July 1, 1941 |
| 2,335,750 | Fincke | Nov. 30, 1943 |